3,275,455
METHOD OF CLOTHING EDIBLE FRESHLY-SKINNED MEAT CARCASSES
Beverly E. Williams, La Grange Park, Ill., assignor to Hodges Research and Development Company, New York, N.Y., a corporation of California
No Drawing. Filed May 4, 1965, Ser. No. 453,182
9 Claims. (Cl. 99—174)

This application is a continuation-in-part of application Serial No. 235,849, filed November 6, 1962, now abandoned.

The present invention relates to the clothing of animal carcasses; more particularly it relates to a method of clothing edible animal carcasses prior to grading and shipping. The term carcass, as used herein, refers to the whole skinned and eviscerated edible animal body as well as to wholesale portions thereof, such as halves (sides), quarters, foresaddles and hindsaddles.

After slaughtering and skinning, a carcass, especially beef, is usually clothed, i.e., wrapped with a brine-soaked cotton cloth, referred to as a shroud. The shrouded carcass is placed in a cooler to eliminate the animal heat. The brine treated shroud, having served its useful function of smoothing and bleaching the surface fat and maintaining a high moisture content without slime formation, is generally removed the day after slaughtering. By this time the shroud has become dry and is less effective in preventing the escape of moisture. Unless the shroud is removed before the carcass has completely chilled and the fat "set up," it will tend to adhere too tightly to the fat surface and cause tearing of the fat during removal. When employing cotton shrouds it has been found that excessive evaporation of moisture often occurs during the first 24 hours causing rapid and uneven chilling of the carcass.

The clothing of beef, lamb and veal carcasses varies somewhat with the nature of the meat and the type of chilling, storing, shipping and grading practices employed. For example, certain meat packers do their own grading and branding of carcasses. In such cases, the carcass is clothed with a shroud on the killing floor and subsequently the packer's grade and trademark or brand name is applied to the carcass by means of a needle brand which penetrates the shroud. The "house" graded carcass may then be shipped to the consumer, with the shroud still applied. Official U.S. Government graders, on the other hand, will not grade a carcass on the killing floor nor will they grade a carcass which has a cloth or obstruction on it, and the government steel-die roller brand can be applied only by directly contacting the carcass with the brand roller. Therefore the shroud placed on the carcass must be stripped off a day or two after slaughtering if government grading is desired. In this case the carcass is normally shipped unwrapped or it is wrapped in a different covering. The shroud is washed and reused.

When the shroud is to be retained on the carcass for an extended time, it must have the ability to hold substantial quantities of moisture so that extensive loss of moisture from the carcass with resultant discoloration does not result. It must also have reasonable strength and resiliency in a moist state so that it will serve to protect the carcass from marring, scarring and bruising during shipment.

When the shroud is to be removed and rewashed after use, it must be capable of resisting the action of the strong detergents and alkalis required in the laundering process to remove the absorbed blood, serum, juices and fat. Moreover, since the shroud is normally reused directly after washing without being dried, it is important that it have a high wet strength and that it be resistant to rot and mildew. Cotton shrouds, for example, because of residual natural oils (and possibly added starch sizing) mildew and deteriorate rapidly.

Whether the shrouds are to be used once or reused several times, they must be resistant to raveling caused by the insertion of skewers and clothing pins into the carcass to secure the shroud to the carcass.

A shroud which could be used as a more or less permanent wrapping, following the carcass to consumer, or as a temporary wrapping capable of being washed and reused a large number of times has long been sought and it is a principal object of the invention to provide a shroud material which can either be retained on the carcass during grading and shipping or removed, prior to shipping for grading, washed and reused.

Another object of the invention is to provide a method for treating carcasses utilizing an improved shroud which can be retained on the carcass for extended periods of time while maintaining the appearance of a freshly slaughtered carcass and avoiding extensive shrinkage and loss of moisture.

A further object of the present invention is to provide a means for clothing carcasses wherein the shroud employed has a useful life many times longer than conventional shrouds.

A further object of the present invention is to provide a shroud which can be subjected to extensive severe launderings without deterioration and without affecting the absorbency, moisture retention and porosity characteristics of the material.

A still further object of the invention is to provide a shroud for clothing carcasses which has improved "wet strength" and which will retain the optimum amount of moisture and juices in the meat during storage and shipment and will improve the tenderness and flavor thereof.

Another object of the invention is to provide a method of clothing carcasses whereby an improved meat product is obtained.

These and other objects of the invention will become apparent from a consideration of the following specification and claims.

In accordance with the present invention, a carcass is clothed with a shroud at least a substantial portion of which comprises a special rayon fiber having certain specific characteristics. In particular, rayon fiber suitable for use in the invention has the following properties: a breaking tenacity (conditioned) between about 3.00 and 6.00 g./den., a breaking elongation (conditioned) between about 11 and about 20%, a modulus (conditioned, initial) between about 40 and about 70 g./den., an average stiffness (conditioned, initial) between about 20 and about 40 g./den., a water swelling (cross sectional) between about 35 and 65%, and a water retention (immersed and extracted) between about 60 and 100%. The shroud will have a vapor transmission rate between about 35 and about 55 grams and preferably 40 to 45 grams of mosture per 100 square inches per 24 hours from an atmosphere of 85–90% relative humidity at 99° F. to a dry atmosphere.

The terms used above are employed in their usual meaning in the textile art. Conditioned tenacity and elongation are believed to be generally understood. As used here, tenacity is determined on an Instron tensile tester with 0.5" gage length. Conditioned modulus means the weight in grams required to stretch a single fiber (0.5" gage length) 5% of its initial length, divided by the denier of the fiber. Average stiffness is determined from the slope of a straight line drawn between origin and the break point on the stress-strain curve, as determined from testing single fibers on the Instron tester at 0.5" gage length. Toughness means the work required to rupture and is determined from the area under the stress-strain curve from origin to break. The above tensile properties were determined for a single staple fiber according to ASTM 540–44.

Cross sectional swelling and water retention are determined in the conventional manner.

Fibers having these characteristics have recently become available from various manufacturers; for exmaple they are available as Fiber 40 (Avril rayon) and Zantrel. In general they are further distinguished, from regular rayon, in appearance by a smooth, non-crenulated surface and a substantially round or circular cross-section. Photomicrographs of their cross sections show little or none of the skin-arc structure characteristic of conventional rayon. They are often referred to as "high-wet-modulus" rayon fibers as this is their principal important distinction over regular rayon. In addition, they have a degree of polymerization between about 500 and about 600 which is substantially higher than that of regular rayon. Furthermore, they have a much greater alkali resistance than regular rayon, having a solubility of less than 8 in 6% NaOH at 20° C. for 30 minutes (regular rayon has a solubility of about 23). They are in general closer in their properties to cotton than to conventional rayon as may be observed from the following table.

|  | Typical Conventional Rayon [1] | Typical Special Rayons Used in the Invention | | Typical Pima Cotton [1] |
| --- | --- | --- | --- | --- |
|  |  | A [2] | B [1] |  |
| Tensile Properties (Single Fiber): |  |  |  |  |
| Breaking tenacity (gr./den.)— |  |  |  |  |
| Conditioned | 2.65 | 3.8–4.0 | 5.0 | 3.65 |
| Wet | 1.55 | 2.8–3.0 | 3.5 | 4.20 |
| Breaking elongation (Percent)— |  |  |  |  |
| Conditioned | 24.0 | 11 | 18 | 10.0 |
| Wet | 28.0 | 13 | 21 | 13.0 |
| Modulus (gr./den.)— |  |  |  |  |
| Conditioned, initial | 20 |  | 60 | 30 |
| Wet, 5% strain | 3 |  | 14 | 15 |
| Average stiffness (gr./den.)— |  |  |  |  |
| Conditioned | 11 | 39 | 28 | 33 |
| Wet | 6 | 24 | 18 | 32 |
| Toughness (gr./den.)— |  |  |  |  |
| Conditioned | 0.32 | 0.20 | 0.45 | 0.18 |
| Wet | 0.27 | 0.17 | 0.38 | 0.27 |
| Moisture Effects: |  |  |  |  |
| Water swelling, cross-sectional, percent | 85 | 35 | 55 | 30 |
| Water retention (immersed, extracted), percent | 115 | 60 | 90 | 60 |
| Moisture regain (at 70° F., 65% R.M.), percent | 13 |  | 13 | 7 |

[1] From Technical Service Bulletin S–24, American Viscose Corporation (Fiber 40, "Avril" Rayon).
[2] From Modern Textiles Magazine, pages 56–62, November 1961 (Zantrel).

A shroud comprising the special, high-wet modulus rayon fiber described above can be retained on the carcass throughout grading and shipping or removed prior to grading. It is whiter than pure cotton and less wooly or knobby than cotton or synthetic fabrics. It has excellent absorbency or, as the term is used in the art, "wicking," moisture retention and porosity. Furthermore, it has been found that carcasses clothed with a shroud made of the special rayon possess a much better appearance. The meat has more bloom and the fat is more bleached. Substantially all of the fieriness of "high color" in the fat due to absorbed blood is eliminated. Because the modified rayon shroud is more absorbent than cotton shrouds, more sodium chloride is absorbed from the brine solution with which the shroud is impregnated before it is applied to the carcass and retained in the shroud without crystallizing out. This makes for greater bleaching and also inhibition of bacterial growth.

The shrouds of this invention are capable of readily absorbing excess moisture from the fat surface of freshly slaughtered carcasses. They provide a uniform distribution of moisture and brine solution over the carcass surface, thus preventing shrinkage and formation of mold and slime. The porosity properties of the cloth serve to slow down evaporation of absorbed moisture, thereby further reducing carcass shrinkage and preventing excessive drying of the carcass surface over prolonged periods. Moreover, shrouds in accordance with the invention are relatively free from raveling caused by skewers and pin holes. Due to the high wet strength and dimensional stability characteristics of the shrouds of the invention, repeated washings and prolonged use under wet conditions do not adversely affect the fabric. Reuse of these shrouds up to 150 or more times with satisfactory results has been achieved. The normal reuse life of the best cotton shrouds available today is between about 40 to 60 launderings.

The invention has the further advantage of enabling an improved meat product to be delivered to the consumer. Since the cloth can be left on the carcass from the time the skin is removed until the carcass reaches the consumer, there is substantially no contamination of the meat. The desirable fresh appearance of the carcass is maintained over the entire period of handling, including chilling, shipping, marketing and holding by the retail dealer. Treatment of the carcass in accordance with the present invention preserves the bloom and freshness of color by eliminating the drying of the surface which accompanies excessive weight loss.

The shroud of the present invention will comprise, as stated, at least a substantial portion of the special rayon. In accordance with the broader aspects of the invention, the shroud may consist substantially entirely of the special rayon, that is the warp and fill may consist essentially of yarns made up of the special rayon. However, if desired, the shroud may comprise a blend of at least 40% of the special rayon and any remainder being other textile fibers, either natural fibers, such as cotton, or synthetic fibers such as nylon (polyamide) or polyester, for example, polyethylene terephthalate.

The blend may take the form of individual yarns of the special rayon combined with individual yarns of other fibers; or fibers of each component may be combined in the same yarn. In these blends, the rayon will normally comprise at least 40%, by weight, of the mixture. Typical modified rayon-cotton blends are 50:50, 60:40, 70:30, 80:20 and 90:10 special rayon to cotton, with an approximately 50:50 blend of the high-wet-modulus rayon to cotton being preferred. Shrouds having excellent wear and tear resistance properties are obtained with modified rayon-nylon or rayon-polyester blends of 65:35 and 90:10 respectively.

The special rayon may be used as continuous filament or staple fiber. The preparation of the shroud can be accomplished following generally conventional textile weaving or knitting operations. A typical shroud constructed for use on beef sides will be a generally rectangular woven cloth between about 72″ and about 120″ long and between about 36″ and about 52″ wide. Lamb shrouds, woven or knitted, between about 30″ and about 52″ long and between about 26″ and 36″ wide are especially preferred. Veal shrouds between about 55″ and about 65″ long and between about 40″ and about 48″ wide are usually used. The shroud will comprise a principal body portion and may contain a selvedge portion along at least one of the long edges. The principal body portion of the shroud will have a construction in which there are between about 20 and about 30 yarns per inch in the warp and between about 20 and 30 yarns per inch in the fill, a shroud having 24 yarns per inch in the warp and 24 yarns per inch in the fill being particularly advantageous. The rayon yarn from which the fabric is made may vary somewhat as to size, and may range between about 3000 and about 4000 yards of yarn per pound. A particularly suitable yarn is one giving about 3200 yards per pound.

The finished cloth may be printed for purposes such as identification of the product or the packer. It is understood that the fabric will be free from objectionable odors, tastes and lint. The shroud material is preferably substantially free from sizing and has a soft texture. Therefore, if the cloth is sized, it is preferably desized by laundering prior to being applied to the carcass.

The rayon fibers suitable for use in the invention are normally produced according to the viscose process wherein a solution of cellulose xanthate is spun in a bath to produce filaments. The basic procedure for preparing these fibers is disclosed in U.S. Patents 2,592,355 and 2,732,279, and more recent embodiments are disclosed in U.S. Patents 3,002,803 and 3,083,075. Further discussion of the manufacture and characteristics of typical high-wet-modulus rayon fibers is found in an article by C. E. Coke in Modern Textiles Magazine, pages 56–62, November 1961, and an article entitled "Recent Developments in High-Wet-Modulus Staple" by J. W. Schappel in TAPPI, Vol. 46, No. 10, October 1963. The disclosures of the foregoing patents and publications are incorporated herein by reference.

In addition to fabrics comprising 100% of the high-wet-modulus rayon and blends of this modified rayon and cotton and/or synthetic fibers as described above, it is understood that suitable shrouding fabrics can be obtained if the fabrics are coated or treated with resin or plastic. It has been found that the shrouds of the invention can be coated according to the method described in U.S. Patent 2,697,664 to Goeser et al., in order to more accurately control the loss of moisture from the carcass. However, such chemical treatments should not adversely affect the strength, absorbency or porosity properties of the fabric.

In contrast to current meat packing practices wherein the cotton shroud cloths are removed and the graded carcass shipped in a wrapping of a different nature, the multipurpose shroud of the invention can be used to clothe freshly killed animals on the killing floor with subsequent "house" grading and branding accomplished without removal of the shroud. The carcasses can then be shipped while wrapped in the shrouds. On the other hand, if desired, the shroud can be removed the next day for government grading and branding and then laundered and reused. In the latter instance, it has been found that a carcass which has been wrapped in a shroud according to the invention is generally given a higher government grade than are carcasses not shrouded, or carcasses shrouded with cotton shrouds.

In applying the shroud to the carcass, the cloth is preferably treated with a solution of sodium chloride having a 5° to 20° salometer reading at 60° F., or with any other conventional mold spore and bacteria-inhibiting agents. When the meat wrap is applied to a warm, freshly killed carcass, which is generally the case with beef and lamb, the cloth is preferably saturated with the solution to the extent of 3 to 4 times its own dry weight. On the other hand, if the carcass has been allowed to chill before skinning, as is normally the case with veal, the wrap is preferably applied in a damp condition containing say 2 to 3 times its own weight of solution. In general, on colt carcasses a minimum moisture content is desirable whereas on carcasses still retaining an appreciable amount of animal heat a thoroughly wet wrap is preferred. The wrapping is tightly applied to the skinned surface of the carcass and fastened thereon by such means as pins, skewers or self-binding tape. When the shroud is to be removed, the fastening means are withdrawn so that the shroud may be unwrapped.

The invention is further illustrated but not limited by the following example.

Example

Four freshly slaughtered lambs are clothed with brine soaked regular cotton shrouds. Four freshly slaughtered lambs of like quality are clothed with brine soaked high-wet-modulus rayon ("Avril") shrouds whose individual fibers (Fiber 40) have the properties defined in the table given above. The carcasses are chilled in the conventional way. Prior to wrapping all of the shrouds are hemmed to avoid ravelling and laundered to remove sizing.

The following day two of the cotton wrapped and two of the rayon wrapped carcasses are unwrapped and inspected. The rayon wrapped carcasses are brighter and superior in appearance to the cotton wrapped carcasses and each of the former graded higher than the cotton clothed carcasses.

The remaining four carcasses are left wrapped for five days in a regular cooler to simulate shipping from the meat packing plant to a distribution point. After five days the rayon wrapped carcasses have retained their color and bloom and are moist, whereas the cotton clothed carcasses are dried out and are not graded as high as the rayon wrapped carcasses.

After the shrouds have been laundered and reused a number of times, say 30 to 40 times, raveling around skewer punctures in the cotton shrouds is evident while the special rayon shrouds are substantially free from raveling. In similar tests involving beef halves as well as lamb, shrouds made entirely of the special rayon ("Avril") as well as shrouds made of a 50:50 blend of the special rayon and cotton have been reused as much as 150 times and were still of good appearance, white and clean.

For purpose of comparison, shrouds made of regular rayon were tried on lamb and beef halves, but these tore badly from the skewers and were completely unsatisfactory for this reason. Moreover, the beef halves to which these regular rayon shrouds had been applied were, the following morning, wet and their fat was soft.

While the invention has been illustrated with references to various specific embodiments thereof, it is to be appreciated that modifications and variations can be made within the scope of the invention as defined in the appended claims.

What is claimed is:

1. The improvement in the treatment of edible, freshly skinned meat carcasses which comprises covering the skinned surface of the carcass with a cloth at least a substantial portion of which comprises high-wet-modulus rayon fibers having on the average the following properties:
    (a) a smooth, non-crenulated surface,
    (b) a breaking tenacity, conditioned, between about 3.00 and about 6.00 g./den.,
    (c) a breaking elongation, conditioned, between about 11 and about 20%,
    (d) a modulus, conditioned, initial, between about 40 and about 70 g./den.,
    (e) an average stiffness, conditioned, initial, between about 20 and about 40 g./den.,
    (f) a water swelling, cross-sectional, between about 35% and 65%, and
    (g) a water retention, immersed and extracted, between about 60 and 100%, said cloth having a vapor transmission rate between about 35 and about 55 grams of moisture per 100 square inches per 24 hours from an atmosphere of 85 to 90% relative humidity at 99° F. to a dry atmosphere.

2. A method according to claim 1, wherein the cloth consists substantially entirely of the high-wet-modulus rayon fiber.

3. A method according to claim 1, wherein the cloth is comprised of a blend of at least 40% of the high-wet-modulus rayon fiber with the remainder selected from the group consisting of natural and synthetic textile fibers.

4. A method according to claim 3, wherein the natural fiber is cotton.

5. A method according to claim 4, wherein the cloth is comprised of an approximately 50:50 blend of the high-wet-modulus rayon and cotton.

6. A method according to claim 3, wherein the synthetic fiber is selected from the group consisting of polyester and polyamide fibers.

7. A method according to claim 1, wherein the carcass is selected from the group consisting of lamb, veal and beef.

8. A method according to claim 1, wherein the cloth is saturated to the extent of 3 to 4 times its own dry weight with a sodium chloride solution having a salometer reading of from 5° to 20° at 60° F.

9. A method according to claim 1, wherein the cloth is moistened to the extent of 2 to 3 times its own dry weight with a sodium chloride solution having a salometer reading of from 5° to 20° at 60° F.

References Cited by the Examiner

UNITED STATES PATENTS

| | | | |
|---|---|---|---|
| 2,697,664 | 12/1954 | Goeser et al. | 99—174 |
| 2,699,396 | 1/1955 | Francis | 99—174 |
| 2,859,583 | 11/1958 | Parker | 57—36 |
| 3,124,467 | 3/1964 | Williams | 99—174 |

OTHER REFERENCES

Coke: "Modern Textiles Magazine," November 1961, pages 56 to 62, inclusive, article entitled Zantrel Polynosic Fiber.

A. LOUIS MONACELL, *Primary Examiner.*

HYMAN LORD, *Examiner.*